(12) United States Patent
Gallagher et al.

(10) Patent No.: US 7,183,554 B2
(45) Date of Patent: Feb. 27, 2007

(54) DETECTION OF NUCLEAR WEAPONS AND FISSILE MATERIAL ABROAD CARGO CONTAINERSHIPS

(75) Inventors: Shawn P. Gallagher, Attleboro, MA (US); Richard C. Lanza, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/113,694

(22) Filed: Apr. 25, 2005

(65) Prior Publication Data

US 2007/0023665 A1    Feb. 1, 2007

Related U.S. Application Data

(60) Provisional application No. 60/566,257, filed on Apr. 29, 2004.

(51) Int. Cl.
*G01T 1/00* (2006.01)
(52) U.S. Cl. .................................... 250/358.1
(58) Field of Classification Search ............. 250/358.1
See application file for complete search history.

(56) References Cited

U.S. PATENT DOCUMENTS

| | | | | |
|---|---|---|---|---|
| 5,200,626 A | * | 4/1993 | Schultz et al. | 250/390.04 |
| 5,838,759 A | * | 11/1998 | Armistead | 358/57 |
| 5,930,314 A | | 7/1999 | Lanza | 378/159 |
| 6,448,562 B1 | * | 9/2002 | Seidler et al. | 250/372 |
| 6,891,470 B2 | * | 5/2005 | Bohinc, Jr. | 340/539.26 |
| 6,965,314 B2 | * | 11/2005 | Bohinc, Jr. | 340/539.26 |
| 6,998,617 B2 | * | 2/2006 | D'Emilio et al. | 250/358.1 |
| 2004/0041706 A1 | | 3/2004 | Stratmoen et al. | 340/539.26 |

OTHER PUBLICATIONS

"In-Transit Container Security Enhancement" (Sep. 9, 2003) http://www.worldshipping.org/security_white_paper.pdf.
Press Release: "Schumer to Customs Department: Why Was Uranium Smuggled into New York Harbor?" (Sep. 12, 2002). http://schumer.senate.gov/SchumerWebsite/Pressroom/press_releases/PR01171.

* cited by examiner

*Primary Examiner*—David Porta
*Assistant Examiner*—Mark R. Gaworecki
(74) *Attorney, Agent, or Firm*—Robert J. Sayre; Mintz, Levin, Cohn, Ferris, Glovsky and Popeo, P.C.

(57) ABSTRACT

A radiation detection system that measures radiation (e.g., signature energy-level gamma radiation and neutrons) is employed aboard a ship or other transport vehicle along with conventional cargo to monitor for the presence of a fissile material, as would be found in a nuclear weapon, or for the presence of other sources of radiation. The detection system can be used over the course of the cargo transport, thereby enabling finely tuned monitoring for fissile material across distances of many meters extending through surrounding cargo containers. Because the system can be utilized during a ship's transport, a positive detection of fissile material can be made and acted upon while the ship is still at sea far from the destination port, where detonation of a nuclear weapon could have catastrophic consequences.

25 Claims, 3 Drawing Sheets

DETECTION OF NUCLEAR WEAPONS AND FISSILE MATERIAL ABROAD CARGO CONTAINERSHIPS

RELATED APPLICATION

This application claims the benefit of U.S. Provisional Application No. 60/566,257, filed Apr. 29, 2004, the entire teachings of which are incorporated herein by reference.

BACKGROUND

The end of the Cold War and the ascendance of transnational terrorism have fundamentally changed the nature of the threat posed by nuclear weapons to the United States (and to other nations). What remains constant is the understanding that the detonation of a single nuclear device on American soil would have immediate and profound impacts, the scale and breadth of which are difficult to comprehend. Given the openly professed desire of terrorist organizations to obtain nuclear weapons and their demonstrated willingness to sow widespread destruction, serious efforts are clearly required to assess this nation's vulnerabilities and to enhance our security posture. One potential class of vulnerabilities are U.S. seaports where currently an average of 15,600 cargo containers arrive by ship every day, any one of which could be used by an adversary to conceal fissile material or an assembled nuclear device.

The currently prevailing model for addressing threats associated with cargo-container-borne fissile material could be characterized as a customs-based approach, where radiation detection systems are integrated into the existing customs infrastructure at ports. The system scans suspect containers as they are unloaded from the ship or as they are subsequently loaded onto a truck or train for inland transport. During this scanning operation, the system utilizes either active or passive techniques to detect nuclear signatures from fissile material in the containers.

The passive scanning technique utilizes detectors to scan for the normal radiation signal from fissile material, while the active scanning technique sends a beam of neutrons or photons towards the cargo causing a unique return signal from subsequent fission events. Most systems have focused on the placement of detector arrays in a wall on or near the docks. Some of the ground-mounted arrays are situated such that semi-trucks or trains pass through detector portals along their normal routes. Almost all of these systems require the vehicle to stop for a few minutes so that a statistically significant number of counts can be collected.

The customs-based approach is a natural extension of conventional strategies for finding and seizing incoming contraband. Nuclear weapons, however, are unlike any other kind of contraband in that their power is so great, and their effects so far-reaching, that discovering them in port (or even allowing them to enter port at all) cannot provide adequate protection from their destructive reach.

SUMMARY

We present here an approach whereby systems for detecting fissile material or other sources of radiation are deployed not in fixed locations at ports, but instead enclosed within standard, nondescript cargo containers to be carried aboard the containerships themselves. To reap returns in sensitivity, stealth, and most importantly, standoff, the ship-based approach of this disclosure replaces the fixed-location, short-duration, proximate-distance signature acquisition characteristic of the customs-based approach with mobile containerized detections units that counterbalance weaker signals from more-distant sources by providing dramatically increased count times.

The detection system measures gamma radiation at signature energies as well as measuring neutron emissions and compares those readings with known background values to evaluate whether a nuclear weapon or other source of radiation (e.g. a dirty bomb) is aboard the ship. For a plutonium-based weapon, detection can be directed to neutrons from the spontaneous fission of $^{240}$Pu; and for a uranium-based weapon, detection can focus on signals from impurities, such as $^{232}$U, preferentially accumulated during the enrichment process. For example, the detection system can be used to detect 1001-keV and 2615-keV gamma radiation, which is a signature of uranium decay processes.

The gamma detector can be provided in the form of an array and used to measure the spatial distribution of detected gamma radiation (i.e, to image the radiation) so as to be able to evaluate whether the source is concentrated. Further, a plurality of arrays can be provided to enable the detector to image radiation coming from any direction. Further still, a coded-aperture mask can be mounted in front (or on opposite sides) of each detector array to improve the imaging capability of the detector.

Further still, the passage of radiation through cargo containers can be simulated, e.g., using Monte Carlo N-Particle Transport Code (MCNP), wherein density values are assigned to three-dimensional pixels in a virtual cargo container as a probability-weighted function of known cargo density percentages in containers (based, e.g., on logs of cargo-content volumes shipped via existing routes). The passage of photons through the pixels along a path from a virtual source of fissile material through a plurality of cargo containers to a virtual detection system to facilitate a better understanding of the behavior of emitted radiation traveling through cargo containers. The results of the simulation also assist in determining how many detection containers should be allocated to a ship and where the detection containers are to be located so as to provide coverage over a desired volume range across which detection is feasible within the ship.

Use of this detection system aboard a ship on the open sea reduces the consequences of a positive detection. Scanning, detection and intervention can all be conducted far from urban areas rather than at a coastal port city and while there is still time to prevent the fissile material or assembled weapon from reaching shore. Because the system will be able to make a positive detection long before a ship would reach the destination port, there will be ample time to turn the ship away and investigate. With current land-based detection systems, the positive detection and intervention may simply occur too late. It is quite conceivable that a terrorist group, if technologically advanced enough to obtain a nuclear weapon, would be able to detonate it from a remote location when the ship passes by a particular target (such as downtown Manhattan). Another possibility is that the terrorists could have an automatic triggering system that would instruct the weapon to detonate upon the opening of the container or even upon receiving an x-ray or neutron interrogation from customs officials. The land-based detection system at the port would not have even had a chance to operate.

Not only does early warning prevent a concealed weapon from ever becoming a threat to a state that employs this system, but it also ensures that responders have greater flexibility in terms of available options for safely containing and neutralizing the threat. The ship-based mobility of the detection systems also renders them less susceptible to tampering than they would be if they were installed at a fixed site (e.g., at a port). Furthermore, cargo scanning at sea will not create bottlenecks at already overburdened ports, and positive detection claims need not disrupt the flow of containers in more than a minimal way. Further still, the system is deployable without building an impractical infrastructure that requires the rerouting of containers.

Additional advantages are offered with the extended detection times available during the transit of the ship. The longer detection time allows for an increase in counting time from the order of minutes to the order of days or even weeks. Employment of this prolonged scanning period over the length of the ship's voyage (e.g., at least several days, and often a week or two or more in transports crossing one or more oceans) reduces error, enables detection of extremely small radiation emissions over time, and greatly expands the number of surrounding cartons that can be reliably scanned. Additionally, sensitivity of the detector is very high due to the prolonged scanning period and the operation of the detector at sea, where background radiation is very low, thereby enabling highly reliable scanning across a large volume stretching through surrounding cartons.

Moreover, the detectors can scan passively, thereby limiting their detectability and removing any potential for harming scanned cargo. We assume that given the limited number of weapons available to such an adversary, every conceivable effort will be made to "booby-trap" the weapon in such a way as to make either active probing with, e.g., x-rays, neutrons, or mechanical examination essentially impossible without triggering the device, thereby producing a nuclear detonation at the port, which would be a successful outcome for a terrorist organization. The option of scanning passively, only, removes or greatly reduces this threat.

Because of the passive scanning and because the system will be entirely inside the cargo container, it will also have the advantage of being able to operate covertly. The detectors can be concealed in a non-descript container having standard cargo dimensions of about 20 or about 40 feet in length, a width of about 8 feet, and a height of about 8.5 or about 9.5 feet, thereby shrouding the presence and/or location of the detection system from terrorists and, accordingly, rendering the detectors less susceptible to evasion and tampering by the terrorists. The detection container, which contains the detection system, will not be used to transport other cargo, as in "smart containers." Smart containers represent one industry approach wherein detection devices are incorporated as a small component of a cargo container used to ship cargo. The detection device in such a container is designed to detect materials within that particular container. Moreover, in the event that a terrorist was trying to smuggle a weapon inside a container, the terrorist likely would not place the weapon inside a container in which a detector was also present, or the terrorist, knowing of the presence of the detector, would work to disable or otherwise circumvent the detector.

Because the detection systems, described here, are designed and configured to detect radiation produced outside the container (e.g., by orienting the faces of the detector elements to detect radiation from any direction), a limited number of detection systems (i.e., as few as one) aboard a ship can be used to monitor a large volume of the cargo area aboard the ship (i.e., covering many cargo containers aboard the ship). The detection systems need not (and, in preferred operations, would not) be placed in every container aboard the ship.

Additional advantages can be gained by using large area detectors. With multiple detectors in an array, the system can generate an image of detected gamma radiation. Use of the array to image the radiation will enable the system to readily distinguish the specific activity of a weapon from the specific activity of naturally occurring radioactive materials, such as a mass block of marble or granite (two materials having a high thorium content). Large areas of saturated activity on the image will correspond to the marble or granite, while small "point-like" areas of intense activity will correspond to the fissile material. Further, fissile material in a weapon will still have a much higher specific activity than the marble or granite. Point-like objects are especially well imaged by coded apertures and thus provide a means for spatially locating threats.

It is important to note that even should the system prove to only detect a fraction of events, a certain amount of "deterrence by denial" (i.e., where the enemy realizes that its likelihood of success is low, and failure is viewed as unacceptable) would be achieved. If it is widely known that the detection systems are being shipped along with other cargo aboard containerships without terrorists having the ability to determine where and when the detection system are in use, then the likelihood of this smuggling route being employed would be diminished. It is no easy task for a terrorist group to obtain a nuclear weapon, so it is unlikely that they would risk sending it on a protected route, even if that route is not 100 percent protected. If only a fraction of events can be shown to be detectable, the goal of shielding this particular smuggling route will likely be achieved through deterrence by denial.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

The following is a description of a proposed system for detecting concealed nuclear weapons aboard cargo containerships. The distinction that will give this system an advantage over other systems in use and in development is that the detectors will be aboard the containership. The system operates passively (i.e., it simply detects radiation that is emitted from surrounding sources and that impacts on the detector—rather than actively directing radiation into containers to stimulate emission). The entire detection system can be confined to one standard container having dimensions, e.g., of 40×8.5×8 ft$^3$ (about 12×2.6×2.4 m$^3$), which is shipped amid the other cargo containers containing conventional cargo aboard the ship. The exterior of the container in which the detection system is contained is designed to be non-descript (i.e., having not visible indicia to indicate the presence of a detection system inside).

The systems described herein are not components of containers that are used to transport other shipping cargo. Further, the systems of this disclosure are not contained in all or most of the containers aboard a ship. Rather, the detection systems can be incorporated in only a minority of containers devoted exclusively to detection and that are otherwise empty (with the detection system potentially filling a substantial or majority portion of the container). Each of the other containers aboard the ship (i.e., the majority of containers) are conventional shipping containers that are filled with cargo and that do not include radiation detectors. Further still, each detection system is configured not to measure radiation originating from within the container in which the detection system is contained but rather from outside the container (i.e., from a plurality of other containers within the ship); specifically the detection system is programmed to look for likely radiation signatures that would come from other containers passing through container walls and other contents of surrounding containers, as derived from Monte Carlo N-Particle Transport Code (MCNP) modeling.

Figure 1:
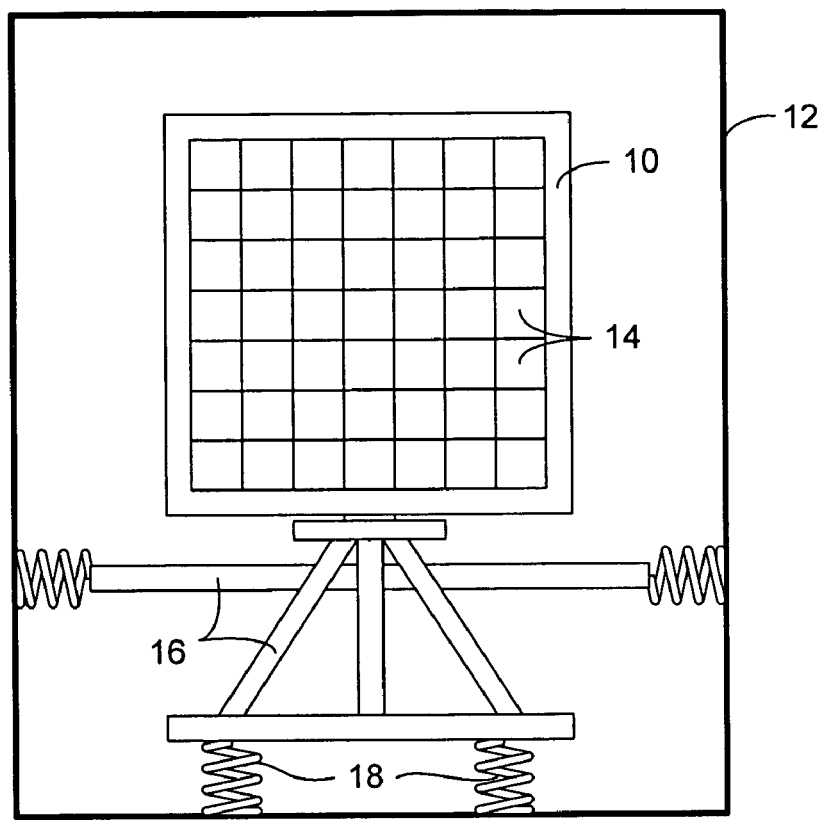
FIG. 1 is a sectional view of a gamma detector array mounted in a cargo container.

A section view showing a gamma detector 10 in a cargo container 12 is provided in FIG. 1. The gamma detector 10 is mounted and secured within the container 12 on a support structure 16, which can include shock absorbers 18, e.g., in the form of springs. In this embodiment, the gamma detector 10 includes an array of crystals 14 (e.g., 10-cm×10-cm×10-cm cesium iodide crystals activated with thallium) coupled with a photomultiplier tube inside the detector 10. Cesium iodide (CsI) is particularly suitable as a detector crystal because of its relatively high efficiency and energy resolution and because of its resistance to thermal and mechanical shock. Cesium iodide crystals are available, e.g., from Saint-Gobain Crystals (Solon, Ohio, USA and Nemours, France).

The gamma detectors can also use sodium iodide (NaI) detector crystals, which are standard for gamma detection where cooling is not possible, though sodium iodide is particularly susceptible to both mechanical and thermal shock. It is common knowledge that while loading a ship, crane operators tend to drop containers from time to time. The mechanical shock of such an event could cause the sodium iodide crystals to crack. Additionally, the possibility of large temperature swings might damage a sodium iodide crystal due to thermal shock; sodium-iodide crystal manufacturers indicate that a common crystal will not withstand a change of more than 15 degrees Fahrenheit (8.3° C.) per hour. Sodium iodide crystals also are available from Saint-Gobain Crystals.

Alternatively, the detector can include other scintillating crystals, or a liquid or plastic scintillator. Given the large volume of a standard 40-ft. (~12-m) container, there is plenty of room for large tanks of liquid scintillator or blocks of plastic scintillator that are sufficiently large to ensure a high efficiency of 2615 keV gamma capture. In other embodiments, the gamma detector is a gas-filled detector, such as a high-pressure xenon tank. In still another embodiment, the detector includes germanium, and a cooling unit for the germanium is also included in the detection container. Also, other materials, such as cadmium zinc telluride (CZT), which do not require cooling, may be employed.

Figure 2:
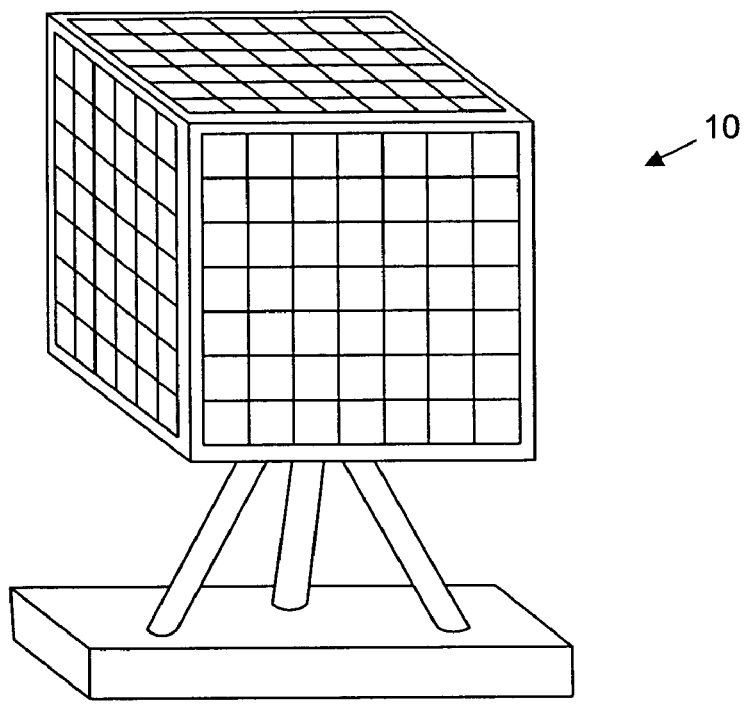
FIG. 2 is a perspective view of the gamma detector array.

Each array of scintillator crystals 14 has a detecting surface with dimensions, e.g., of about 1-m×1-m, though the arrays can be made larger or smaller, as desired. The crystal arrays of the detector, in the aggregate, extend in all three dimensions, as shown by the three faces, oriented orthogonally to one another, of the detector 10 illustrated in FIG. 2. This configuration is in contrast with the common planar imaging scanners seen at ports or border crossings. The weapon could be in any direction relative to the detector, and a planar array only "looks" in one dimension efficiently. Three detector arrangements are provided in this section, but the ultimate configuration will depend on the cost/benefit analysis made by the government and vendor.

The first, and perhaps most efficient, configuration for the gamma detector is a sphere of outward facing detector arrays. However, another constraint is the desirability of using a coded-aperture mask, the development of which has thus far targeted flat-surface reconstruction (and not reconstruction on a spherical surface).

In another embodiment, the detector arrays are configured in a cube, with a coded-aperture mask in front of each face. The use of coded-aperture masks and the processing of images produced therewith are described, e.g., in U.S. Pat. No. 5,930,314; U.S. Pat. No. 6,737,652; and U.S. Pat. No. 6,205,195; each of which is incorporated by reference herein in its entirety. In short, the concept of coded aperture imaging is partly based on that of a single pinhole camera. In one example of a pinhole camera system, a sheet with a single pinhole is placed between a detector array and a source. Thus, when an individual detector in the detector array detects a photon, a processor can determine from which direction the photon came based on the location of the pinhole with respect to the individual detector.

To enable more photons to reach the detector (compared with a pinhole camera), the coded-aperture mask includes multiple specially arranged apertures. Known aperture patterns used for coded-aperture masks include a random array, a Fresnel zone plate, and a uniformly redundant array. Coded-aperture techniques are different from conventional planar imaging methods in that the detected signal is not a directly recognizable image. The signal is encoded and must be decoded before a visible image can be obtained. Coded-aperture methods include two processes: coding and decoding. First, information about the object being imaged is coded in the detected signal; second, the detected signal can be decoded to form a three-dimensional image of the object. Decoding of the recorded signal can be performed as a correlation or deconvolution operation in the space domain, or a Fourier transform and filtering (multiplication) operation in the reciprocal (frequency) domain followed by an inverse Fourier transform. Other transforms, such as a Hadamard transform, can be used instead of the Fourier transform.

While probably the most practical, configuration the detector crystals into the form of a cube may not be the most efficient design. A more efficient design may be an embodiment wherein the detectors are arranged in a half-pyramid with three planar arrays, each orthogonally oriented relative to the other planes, which would still enable detection of radiation approaching from any direction (e.g., from above, from below, or laterally from any side). If a half-pyramid having 1-m edges is made of 10-cm crystals, and if crystals at the edges are shared between adjoining faces, then the half-pyramid can include 271 detector crystals. Coded apertures can still surround the pyramid, but fewer detectors are used—in comparison with a full cube shape.

In yet another alternative embodiment, the detector array is not a separate free-stranding structure inside the container;

rather, the container, itself, serves as a substrate for detector panels that are painted onto or adhered to inner surfaces of the cargo container.

Using an iterative reconstruction approach, a single detector array can obtain three-dimensional information without motion. The detectors are placed in such an array so that the system can distinguish between a distributed natural background and a concentrated point source. Use of the coded-aperture mask also reduces background, minimizes false positives and improves detectability. On a basic level, the coded-aperture mask is essentially a partially opened mask that allows some photons through, while blocking others. The pattern of photons that are allowed to pass can be used through detailed reconstruction algorithms to reduce background, thus enhancing point-like or relatively point-like images.

More details on the use of coded apertures and associated electronics for radiation imaging is provided in R. Accorsi, et al., "A Coded Aperture for High-Resolution Nuclear Medicine Planar Imaging with a Conventional Anger Camera: Experimental Results," 48 *IEEE Transactions on Nuclear Science* 6, p. 2412 (2001); and in K. P. Ziock et al., "Large Area Imaging Detector for Long-Range Passive Detection of Fissile Material," 51 *IEEE Transactions on Nuclear Science* 5, p. 2238–2244 (2004); both of these articles are incorporated herein by reference in their entirety.

Essentially, the radiation source projects only one shadow on the detector array, while the distributed background projects many shadows on the array. The reconstruction process takes into account different projections and significantly reduces background, leaving mostly the source in the image. In this way, background from the ocean, ship and cargo can be reduced to increase confidence in detectability and reduce false positives.

Additionally, a neutron detector (available, e.g., from Canberra Industries of Meridien, Conn., USA, or from LND, Inc. of Oceanside, N.Y., USA) can be included in the system to detect spontaneous fission neutrons from $^{238}$Pu and $^{240}$Pu, which can be particularly useful for monitoring for plutonium because weapons-grade plutonium offers a comparatively weak direct gamma-ray signal, though secondary gamma rays can be produced (and detected) due to the interaction of neutrons from plutonium with the surrounding material. Also detectable are high-energy gammas from fission product decay. The neutron detector can include a single detection body (rather than an array), and it need not measure the spatial distribution of emitted neutrons. The neutron detector is electronically coupled with a shared data processor and transmission system, with which the gamma detector is also coupled.

A suitable neutron detector is a standard $^3$He tube commercially available through many vendors. A $^3$He detector can provide high detection efficiency. It is not necessary to choose a neutron detector with an attached moderator because neutrons will be well thermalized by the time they traverse the weapon (especially the high-explosives) and intermittent cargo. Alternatively, the neutron detector can be a common $BF_3$ proportional counter.

In one embodiment, the detection system includes an array of plastic or liquid scintillators that detects both neutrons and gamma radiation (rather than using separate neutron and gamma detectors). Also, a single large plastic detector or tank of liquid Scintillator may be used.

Figure 3:
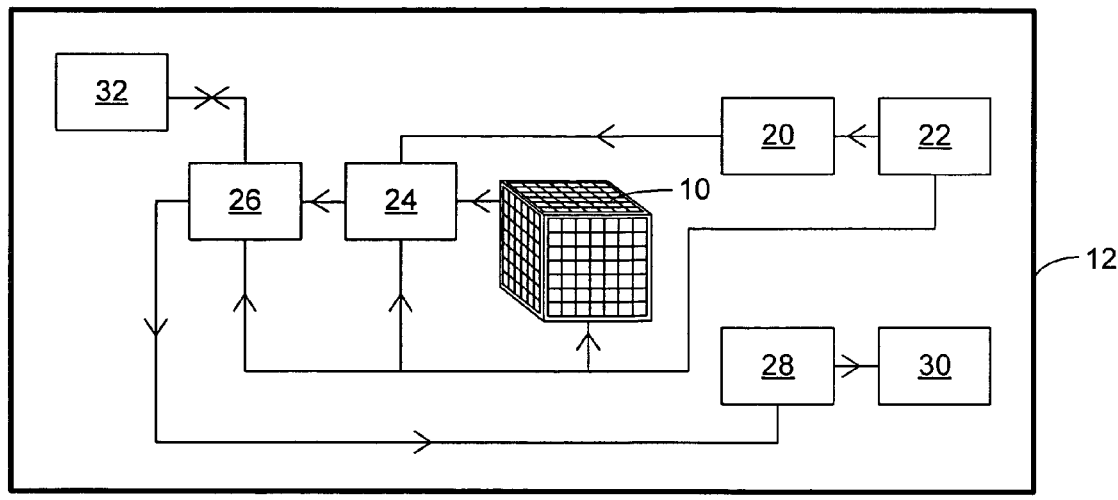
FIG. 3 is a schematic, overhead view of detection system components in a cargo container.

A schematic top view of the contents of the detection container 12 is provided in FIG. 3. The gamma detector 10 and the neutron detector 20 detect gamma radiation and neutrons, respectively. Both are powered by a power source 22 (e.g., a battery or a generator) within the container 12. The power source 22 also powers signal-processing electronics 24, a computer 26, a transmitter 28, a local transponder 30, and a receiver 32 for remote access. There is no cargo in the container 12, only the elements of the detection system.

The computer 26 (e.g., a personal computer running a Windows™ operating system) receives data from a multi-channel signal processor 24 and processes the information. Data processing includes not only normal background-reduction algorithms, but also reconstruction of the coded-aperture image. The computer 26 is directly linked to the transmitter 28 so that the data can be sent.

Suitable software programs that can be utilized to process the radiation measurements include the GammaVision™-32 V6 spectroscopy software program from Ortec of Oak Ridge, Tenn., USA; the InterWinner™ 5 spectroscopy software program, which is also from Ortec; and the FRAM software code developed at Los Alamos National Laboratory and licensed for commercial distribution to Canberra Industries of Meridien, Conn., USA.

The transmitter 28 sends data back to a remote, land-based location for analysis and possible dissemination to individuals who are responsible for emergency response/intervention. Transmission can occur through direct broadcast to the remote location or, more likely, via a satellite link. One option for minimizing the number of signals bounced off satellites is to provide the containerized detection systems with a local transponder 30 to enable the detection systems on board the ship to communicate with each other wirelessly and to provide at least one master unit or an independent communications hub on each ship with a transmitter for broadcasting the signal to the satellite. Enabling the detection systems to communicate with each other also enables them to work cooperatively, for example, if one detection system makes a positive detection, the detectors in other detection systems can be pivoted (e.g., when mounted on a drive shaft coupled with a rotary motor) to face in the direction of the suspected source of radiation.

Alternatively, the wireless network can be coupled with the ship's radio system so that the data from the transmitter in each detection container can be transmitted from the container to the hub and then through the ship's communication system to a remote computer monitoring system, which can provide simultaneous global monitoring of ships and trigger an alarm whenever a positive detection is made by one of the detection systems. Alternatively, the data can be transmitted to the remote computer monitoring system in a more raw form, where more of the data processing is carried out by the remote computer monitoring system.

Each containerized detection system can also include a receiver 32 that can accept instructions from, e.g., the remote computer monitoring system to adjust its operations or to provide requested data. The detection containers can also be packed with insulation, particularly around the detector crystals to prevent the crystals from cracking due to large temperature gradients or at low temperatures, as may be encountered, e.g., by ice-breaker ships traversing near the arctic circle or near Antarctica.

The non-descript nature of the containerized ship-based detection systems allows these units to operate covertly. Nevertheless, as an additional countermeasure just in case the detector's location is discovered, the container can also be secured with an alarm system that will signal a remote monitoring center that the container has been opened. This alarm condition can also be initiated if the unit suddenly stops sending data.

In some embodiments, an active system is deployed alongside the passive detection system in the detection container. The active system lies dormant until a positive detection is made by the passive detectors and then interrogates surrounding cargo containers by emitting radiation in the direction of the suspected radiation source. The active system can emit neutrons and/or photons, and the passive detection system will then detect a return signal generated by the interaction of those neutrons and/or photons with fissile material, if present. The radiation can be emitted in pulses so that the detector system is not swamped with the active system's emitted radiation. Further still, the active system can be mounted for rotation, e.g., on a ball-joint, so as to enable focusing a beam of emitted radiation from the active system in a suspected direction from which the radiation has been detected. The active system can also be equipped with a receiver so that it can be activated upon a positive detection by the passive system and so that it can receive instructions for directing its emitted radiation. Alternatively, active interrogation of cargo can be provided by unmanned aerial vehicle (UAV) or helicopter flights outfitted with accelerators that can actively interrogate the suspected area of the ship with either neutrons or photons. The active system can also incorporate a precision time base or one derived from a global positioning satellite (GPS) to "time stamp" each event (e.g., each pulse of radiation emitted by the active system and each detection of radiation, i.e., the "return" signal). This time stamp can be used to enhance background rejection, since the operator or control system will know when the interrogating signal was sent and will have an approximate expectation as to when to expect the return signal (particularly, by looking for a spike in detector readings) if fissile material is present.

Having explored the contents of the detection container, the citing of these detection containers amid the cargo containers on a ship is discussed, below. The long count time during a typical two-week voyage allows sufficient radiation to be transmitted from a weapon, through cargo containers, and to the detectors in the detection container to enable detection of weapons-grade uranium and plutonium in implosion-type configurations with three-sigma confidence from distances averaging 22.0 and 23.5 meters of cargo respectively.

In particular embodiments, between 3 and 20 detection containers are deployed on each ship, depending on the ship's cargo capacity and the degree of control exercised over container placement. The ratio of detection containers to cargo containers that do not include detection systems aboard the ship can be, e.g., in the range of 1:100 to 1:650. The detection containers can be loaded in a "centerline" pattern (i.e., along the centerline of the stacked cargo containers extending through the length of the ship) to target optimal coverage volume; alternatively, the detection containers can be loaded in a random pattern where no control is assumed for placement of the containerized detectors.

There are two deployment objectives for attaining a desired level of deterrence by denial. First, the enemy should be aware that containerized detectors exist and are operational; and second, the enemy should know that he cannot locate a significant percentage of the detectors. Given the desirability of covert deployment and necessity of visible deployment, some percentage of containerized detectors can operate covertly to ensure the element of fear, and some percentage are visible to ensure the credibility of the deterrent. Accordingly, a combination of centerline and random deployments can be used to achieve both objectives.

Another deployment enhancement that may increase deterrence is the use of dummy detection containers so as to thwart an enemy conducting surveillance of the ship-based system in hopes of uncovering loading and shipping patterns. The dummy detectors can be sent from the same holding pen as the actual detection containers. These dummy detectors could consist of a blatantly transmitting device that would suggest to the adversary that they are real operating systems, though the dummy detection containers would not contain the actual detectors.

With this containership system, the detection times will only depend on the amount of time that the cargo is en-route. This is usually on the order of days and possibly weeks and will allow sufficient time to resolve even a very weak signal. Adding to the significance of the long detection times is the fact that detection systems can be located further from the source.

Even with high signal attenuation in dense materials, the long count times over the course of an oceanic voyage (often on the order of two weeks) as well as the existence of random pathways of air through cargo allow transmission of even weak radiation signals through several cargo containers.

Finding fissile material is a difficult task not only because most gamma radiation from a weapon is emitted at low energies and is therefore easily shielded but also because neutron and gamma emission from highly fissile isotopes, $^{235}U$ and $^{239}Pu$, is almost non-existent. Ironically, it is the methodology necessary to create materials of mass destruction that introduces a detectable signature. The enrichment process preferentially introduces the impurity $^{232}U$ in reprocessed weapons grade uranium and the creation of plutonium in a reactor produces significant quantities of $^{240}Pu$, both of which are not found in nature, but are highly detectable.

To better understand how the radiation from a fissile material would penetrate through cargo containers and their contents, computer simulations were carried out using the MCNP-5 code (developed at Los Alamos National Laboratory). The use of MCNP in simulations is described in the standard reference, J. F. Briesmeister, Ed., "MCNP—A General Monte Carlo N-Particle Transport Code," LA-13709-M, which is incorporated herein by reference in its entirety. Specifically, the MCNP code was used to simulate the radiation emitted from a nuclear weapon, wherein the contents of surrounding cargo containers were simulated by subdividing the volume of the containers into pixels (in this case, pixels that were 1.0 m×1.0 m by 1.5 m) with the longer pixel dimension extending along a line between the detector and the weapon, and randomly assigning densities to the pixels based on known volumes/frequencies of shipped cargo contents and the densities of those contents, including the air content in containers. Calculations (based on known shipping quantities of cargo content, content densities, and container volumes) indicate that the container volume includes, on average, about 76% air.

We assume that weapons-grade uranium or weapons-grade plutonium will be in the weapon; accordingly, simulations were run with 50 kg of weapons-grade uranium and 12 kg of weapons-grade plutonium. For models including weapons-grade uranium, the simulated shielding was an encompassing sphere of lead 2-cm thick. For neutrons, two shields were considered, one 5-cm sphere of water equivalent and one 20-cm sphere of polyethylene.

Figure 4:
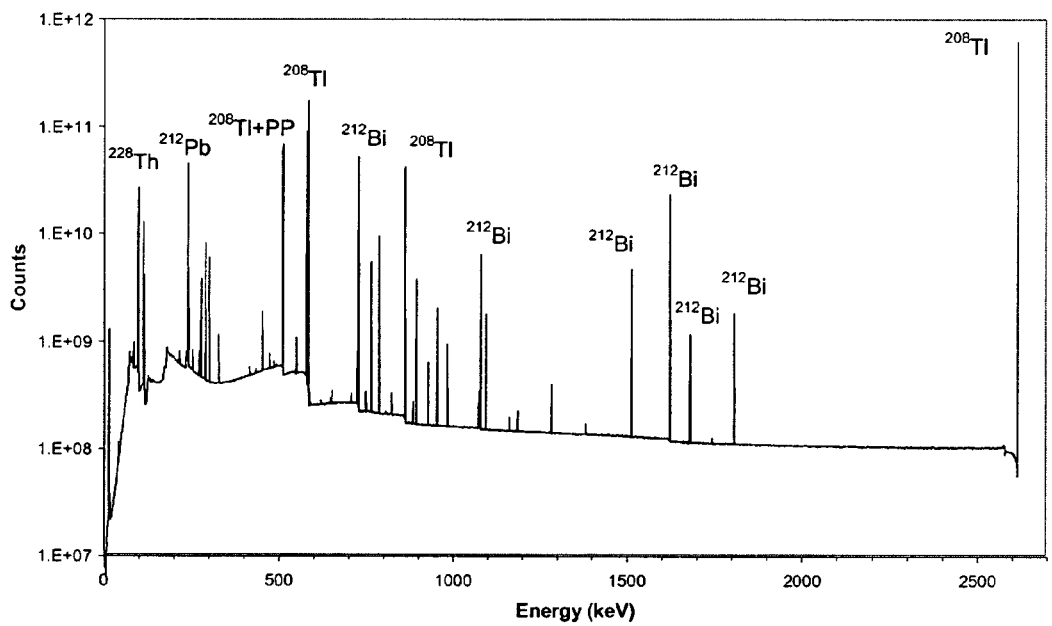
FIG. 4 is a graph showing the spectrum of gamma radiation (as simulated by MCNP modeling) exiting the core of a weapon containing 12 kg of 30-year-old uranium with 100 parts per trillion $^{232}$U.

The graph presented in FIG. 4 is the spectrum of gamma radiation (as simulated by MCNP modeling) coming out of the core of a weapon containing 12 kg of 30-year-old uranium with 100 parts per trillion $^{232}$U. Of great interest are peaks with high energy, which will have better transport and lower background. Several major peaks have been identified, but the large difference in counts and background of the 2615 keV peak (from the daughter product, $^{208}$Tl) is clearly very attractive for detecting uranium. The $^{212}$Bi peaks are of interest because of their high energy and low background; however, they are all orders of magnitude less intense than the 2615 keV peak.

In the MCNP simulation of gamma radiation exiting the high explosive and passing through adjacent containers and their cargo, on average, only around 1 in $10^{12}$ gamma particles reach the detector at 22+ meters. Nevertheless, a two-week exposure results in a flux of 10,000 to 100,000 gamma particles reaching the detector, thereby enabling identification of the 2615 keV peak at distances up to 22 meters or further (depending on the content of intervening cargo containers) from the source.

Notwithstanding the reduced transport efficiency at lower energies, these simulations suggest that source verification using the 1001 keV line (from the $^{238}$U daughter product, $^{234m}$Pa) remains practical through at least 13 meters.

In MCNP simulations (with 2 cm of lead shielding a source with 12 kg of 30-year-old uranium having 100 parts per trillion $^{232}$U), the effect of lead shielding around the uranium was found to be surprisingly minimal, but not insignificant. There was still an above threshold flux at more than 20 meters and the average distance to threshold was about 19.5 meters. Even with a 20-cm-thick sphere of polyethylene (or other low-density hydrogenous material) surrounding the weapon, the ship-based system can detect neutrons penetrating through almost 20 meters of cargo on average.

In contrast with the above-described method of looking for uranium, the gamma radiation signature of plutonium is not strong. Plutonium does not, by itself or via any of its daughters, give off any high-energy, high intensity gammas. Of note, however, is the $^{241}$Am daughter of $^{241}$Pu, which emits a 662 keV gamma with relatively high intensity. This line will be indistinguishable from the $^{137}$Cs line possibly found in benign medical isotopes within normal cargo so that, by itself, the 662 keV line is not enough to assume a positive detection of weapons grade plutonium.

Fortunately, plutonium can be detected by directly looking for neutrons or by inferring their presence from unique secondary reactions. Neutron interactions including radiative capture and inelastic scatter will produce high-energy gammas that can be detected. Also, fission product decay produces detectable high-energy gammas. There are virtually no sources of neutrons in common cargo and the background (from the "ship-effect") is expected to be fairly constant.

Accordingly, the presence of weapons-grade plutonium can be detected by looking for neutrons. The signal from spontaneous fission neutrons in weapons-grade plutonium is orders of magnitude stronger than that of uranium. The strength of the signal is highly dependent on the amount of $^{238}$Pu and $^{240}$Pu in the fissile material. The spontaneous fission half-life of $^{238}$Pu is $5.0 \times 10^{10}$ years, while that of $^{240}$Pu is $1.2 \times 10^{11}$ years, giving $4.39 \times 10^{-19}$ and $1.83 \times 10^{-19}$ neutron emissions per second per atom, respectively. $^{239}$Pu spontaneous fission neutron intensity is of the same order as $^{238}$U and therefore insignificant. When combined in the assumed weight percentages for the weapon model and accounting for ($\alpha$, n) reactions, 56,000 neutrons per kilogram per second are produced. Furthermore, significant multiplication, where spontaneous fission and ($\alpha$, n) neutrons cause normal fission, can occur for larger quantities of plutonium. For 4 kilograms of weapons-grade plutonium, the number of neutrons leaving the core surface per kilogram per second turns out to be around 110,000, which is readily identifiable over the natural background.

Neutrons may also undergo inelastic (n, n' $\gamma$) collisions while still slowing down in the weapon (and possibly in the cargo), which can produce high-energy gammas. While a considerably lower flux is expected without active interrogation, the number of gamma photons having an energy of 3 MeV or greater from fission fragment decay will not be negligible, especially when contrasted with the essentially zero background at these energies.

Neutrons that escape the weapon will interact with the surrounding cargo. Cargo could have almost any isotopic composition, but much of it is organic. This will allow for further interaction with hydrogen, oxygen and nitrogen, producing more high-energy gammas. If the weapon happens to be situated in the center of the containership, the cargo will likely capture a significant portion of the neutron flux. Even if situated near the edge, high percentages of the total neutron flux will be captured before leaving the ship. The neutron flux will be well thermalized by the time it leaves the weapon, but there still exists the possibility of (n, n' $\gamma$) interactions in the cargo. The detection of a flux of gammas from 2–11 MeV that is significantly higher than background, would signal the presence of a large neutron flux and therefore fissile material.

It is also possible that a large flux of neutrons from a cosmic event, such as a solar flare, would cause a benign increase in high-energy gammas and neutrons, but this would be an impulse event and could easily be distinguished from the constant flux of high-energy gammas from spontaneous fission neutron capture. Moreover, a solar event would be simultaneously detected by other deployed units and various scientific endeavors throughout the world and could therefore be recognized (and discounted) as such.

Inherent to almost all land-based detection systems is the interference of natural background radiation. Uranium and especially thorium in the ground and in building materials offer an extremely competitive signal. The problem lies mainly in the decay chain of $^{232}$Th, which includes the same radioactive daughters (e.g., $^{208}$Tl) as the uranium-based nuclear weapon, thereby producing the characteristic 2.6 MeV gamma-radiation signal, discussed above. Natural thorium concentrations vary from place to place and will give a strong enough signal to significantly reduce the confidence of a positive detection event. The advantage that this seaborne approach has over the land-based systems is that there is virtually no thorium in the ocean water. One study gives thorium concentrations at 16 parts per trillion in ocean water and an average 1 part per million on land (the concentration can be over 100 parts per million in granite). Accordingly, moving from a land-based procedure to a sea-based procedure provides an advantage of reduction of natural background of 5 to 7 orders of magnitude.

Both granite and marble are high in thorium and will therefore interfere with the weapon's discrete gamma spectrum. Nevertheless, the presence of a large mass of granite or marble aboard the ship need not be a source of false positive detections because the specific activity of the weapon will still be much higher than the specific activity of the granite or marble. Large areas of saturated activity on the image will correspond to the marble or granite and small areas of intense activity will correspond to the fissile material, and the presence of a weapon can thereby be distinguished from those other sources via the practice of imaging using a large area detector array.

Further still, the following procedure can be employed to distinguish benign cargo and fissile material, taking advantage of the fact that actinium gamma lines will be present in the spectrum of natural thorium but not in the spectrum of the weapon. The absence of actinium lines in the weapon can be used to distinguish the thorium's 2615 keV contribution to the measurement from the weapon's contribution. Armed with knowledge of the nearly exact relative decay intensities of $^{228}$Ac and $^{236}$PU/$^{232}$U daughter lines, the contribution of daughter isotopes, such as $^{208}$Tl from the natural background, can be essentially subtracted from the total measurement. Once the background has been removed, a more accurate representation of the weapon can be made and potential false alarms can be minimized.

There is no significant contribution of 2615 keV and 1001 keV background from the ocean water, even with a large volume taken into consideration. Likewise, the various material constituents of the ship produce negligible 2615 keV and 1001 keV gamma radiation.

The most concentrated source of thorium and uranium in cargo comes from cargo made of rock and, in particular, granite and marble. While almost all forms of commercial granite and marble have some concentration of thorium and uranium, a few relatively rare types of granite and marble have high concentrations of thorium, especially those originating from Brazil and India, where huge deposits exist; however, most granites and marbles contain very little thorium and uranium.

Per implementation of U.S. Customs Office policy, all shippers are required to report the contents of their sealed containers at least 24 hours prior to loading at the foreign port. This information could be used as a way to pre-empt false alarms by simply cross-referencing the containership's manifesto. Any major shipments of granite, while still unlikely to cause a false alarm, would be known in advance and would therefore be used to adjust expected backgrounds.

In much the same way as the 1001 keV line can be used to confirm the presence of fissile material relative to benign granite, the presence of a 911 keV line can be used to confirm benign quantities of granite relative to fissile material. Simply put, a measurement of 2615 keV gammas accompanied by 1001 keV gammas indicates the presence of fissile material, while a measurement of 2615 keV gammas accompanied by 911 keV gammas indicates the presence of natural thorium (via the signal from its decay product $^{228}$Ac) in granites and marbles.

Based on worst-case estimates wherein the cargo includes 1000 tons of Café Brown granite in the detector's field of view, conservative estimates (not accounting for spectroscopic source reduction) put the number of 2615 keV gammas detected over a two-week voyage at $5.3 \times 10^6$ per square meter.

Once the ship-based system is deployed, a database of typical backgrounds (i.e., the backgrounds that interfere with the detection of fissile material, specifically, gamma background at energies of 2615 keV and 1001 keV) aboard containerships can be established by logging those readings. Most measurements will be benign, thereby at minimum producing a good characterization of the background. These background spectra can be fed back into a central database for constant cross-reference and used in background subtraction algorithms. The longer the system is deployed, the more valuable the database will become.

Furthermore, after an extensive search, including hundreds of possible medical and industrial isotopes, it appears safe to conclude that no other naturally occurring isotopes or expected cargo materials, beyond thorium and uranium, are likely to release radiation that directly interferes with the 2615 keV and 1001 keV lines.

Interfering background signals for the neutrons can also be countered. Neutrons from terrestrial sources are almost non-existent. The vast majority of neutron background is induced by cosmic events in the atmosphere. Cosmic ray muon interactions in the upper atmosphere cause a cascade of particles, a percentage of which are neutrons. Cosmic neutrons can be detected directly or can interact with other nuclei in spallation events. Due to spallation, an increase in the neutron population near dense, high-mass-number objects is commonly seen and several groups have measured this phenomenon.

As a result of interest in the increased flux around high-atomic-number materials, the ship-effect has been studied extensively. A detailed survey of ship-effect literature has produced a fairly comprehensive measurement of neutron populations on sea-going vessels. Most of these measurements were made on U.S. Navy ships and can be considered good approximations as to what might be seen on a containership.

Between 10 million and 1 billion neutrons can be expected to be detected due to natural background over a two-week voyage. Measured fluxes onboard ships suggest an estimated detection of $1.54 \times 10^8$ neutrons per square meter per two weeks from background. This number can used as benchmark for neutron detectability calculations.

Upon a positive detection, a ship or plane can be sent out to interdict and attempt to verify the positive detection, e.g., via active scanning of suspected containers with neutrons or photons. The ship can then be redirected, e.g., to an isolated location, or the cargo removed to prevent the fissile material from reaching the intended port.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

Figure 5:
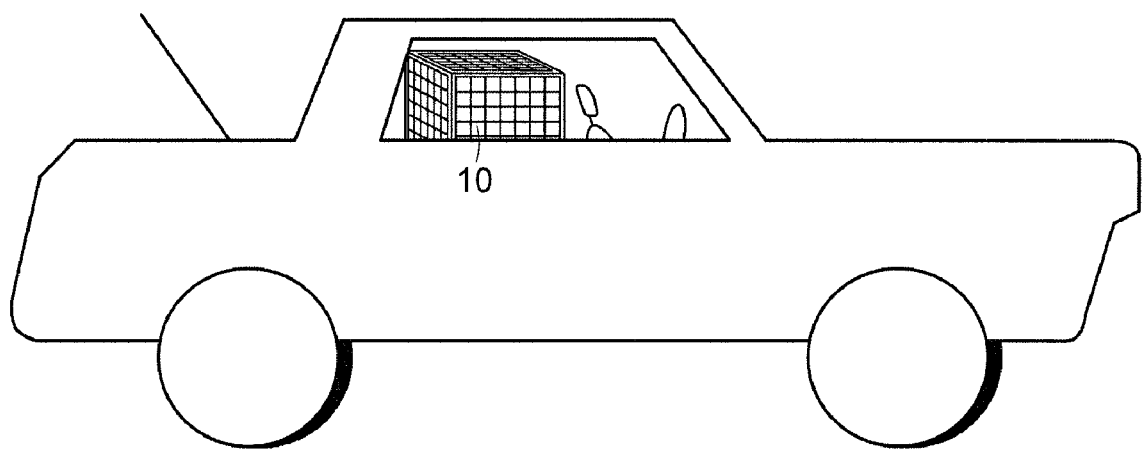
FIG. 5 is an illustration showing a detector mounted in a car body.

For example, although the above discussion has focused on the use of detection containers aboard sea-going cargo ships. Detection containers can also be used in other cargo transport vehicles, such as in air planes, trains, trucks, cars, and oil tankers. The containers can be smaller in these other contexts where smaller containers (e.g., a container resembling a large express-delivery package) would more closely resemble other cargo containers aboard the particular vehicle type. In still other embodiments, the "containers" can be the body of a car, as shown in FIG. 5, or other vehicle type; this embodiment is particularly advantageous for a cargo ship loaded with vehicles. The detection container accordingly would appear to be an ordinary vehicle indistinguishable from others aboard the ship; the detection system can be mounted, e.g., inside the trunk of the vehicle body.

What is claimed is:

1. A method for detecting a radiation source aboard a cargo containership comprising:
   loading a plurality of containers onto a cargo containership, wherein at least one but fewer than all of the containers is a detection container that contains a detection system configured to detect radiation entering the detection container from another container;
   recording detection of gamma radiation by the detection system and determining if the detected gamma radiation exceeds a threshold so as to indicate the presence of the radiation source, the detection container also containing a transmitter for transmitting a signal beyond the detection container if the threshold is exceeded, wherein the spatial distribution of gamma radiation entering the detection container is imaged with an array of gamma detectors.

2. The method of claim 1, wherein the measurement of the spatial distribution of the detected gamma radiation is evaluated to determine whether the radiation comes from a concentrated source.

3. The method of claim 2, wherein the detected gamma radiation passes through a coded-aperture mask in the detection container before being detected by a gamma detector in the array.

4. The method for detecting a radiation source aboard a cargo containership comprising:
   loading a plurality of containers onto a cargo containership, wherein at least one but fewer than all of the containers is a detection container that contains a detection system configured to detect radiation entering the detection container from another container; and
   recording detection of radiation by the detection system and determining if the detected radiation exceeds a threshold so as to indicate the presence of the radiation source, the detection container also containing a transmitter for transmitting a signal beyond the detection container if the threshold is exceeded,
   wherein gamma radiation at 2615 keV is specifically measured and evaluated to determine whether the $^{208}$Tl daughter product of $^{232}$U is present.

5. The method of claim 4, wherein the detected radiation further includes neutrons.

6. The method of claim 5, wherein the gamma radiation is detected with gamma detectors and the neutrons are detected with neutron detectors that are distinct from the gamma detectors.

7. The method of claim 4, wherein gamma radiation at 1001 keV also is specifically measured and evaluated to confirm whether a 2615 keV peak is from the decay of uranium or from other sources.

8. The method of claim 4, wherein gamma radiation at 911 keV also is specifically measured and evaluated to confirm whether the 2615 keV peak is from the decay of uranium or from $^{228}$Ac, a daughter of $^{232}$Th.

9. The method of claim 4, wherein the radiation is detected and the data is transmitted while the ship is at sea away from port.

10. The method of claim 9, wherein neutrons and gamma radiation are detected aboard the cargo containership for a plurality of days.

11. The method of claim 4, wherein at least one detection container has substantially the same dimensions as the containers that are not detection containers, and wherein the presence of the detection system in that detection container is not visibly discernable from outside the detection container.

12. The method of claim 4, further comprising transmitting a signal including data relating to detected radiation from the container to a receiver outside the detection container.

13. The method of claim 12, further comprising transmitting a signal from inside a dummy container aboard the ship, where the dummy container does not contain a detection system.

14. The method of claim 4, wherein between 3 and 20 detection containers are loaded onto the ship along with more than 20 containers that do not contain detector systems.

15. A method for detecting a radiation source aboard a cargo containership comprising:
   loading a plurality of containers onto a cargo containership, wherein at least one but fewer than all of the containers is a detection container that contains a detection system configured to detect radiation entering the detection container from another container; and
   recording detection of radiation by the detection system and determining if the detected radiation exceeds a threshold so as to indicate the presence of the radiation source, the detection container also containing a transmitter for transmitting a signal beyond the detection container if the threshold is exceeded,
   wherein the contents of at least one detection container consist essentially of components that are part of, connected to, or in communication with the detection system.

16. A method for detecting a radiation source aboard a cargo containership comprising:
   loading a plurality of containers onto a cargo containership, wherein at least one but fewer than all of the containers is a detection container that contains a detection system configured to detect radiation entering the detection container from another container and an active interrogation system that includes a source configured to emit photons or neutrons; and
   recording detection of radiation by the detection system and determining if the detected radiation exceeds a threshold so as to indicate the presence of the radiation source, the detection container also containing a transmitter for transmitting a signal beyond the detection container if the threshold is exceeded.

17. The method of claim 16, further comprising using a time stamp to track the timing of emissions from the active interrogation system and to track the timing of radiation detection.

18. A method for detecting a radiation source aboard a cargo containership comprising:
   loading a plurality of containers in the form of car bodies onto a cargo containership, wherein at least one but fewer than all of the containers is a detection container that contains a detection system configured to detect radiation entering the detection container from another container; and
   recording detection of radiation by the detection system and determining if the detected radiation exceeds a threshold so as to indicate the presence of the radiation source, the detection container also containing a transmitter for transmitting a signal beyond the detection container if the threshold is exceeded.

19. A method for detecting a radiation source aboard a cargo containership comprising:

loading a plurality of containers onto a cargo containership, wherein a plurality but fewer than all of the containers are detection containers, each containing a detection system configured to detect radiation entering the detection container from another container; and wherein the detection systems contained in distinct detection containers communicate with each other; and recording detection of radiation by the detection system and determining if the detected radiation exceeds a threshold so as to indicate the presence of the radiation source, the detection container also containing a transmitter for transmitting a signal beyond the detection container if the threshold is exceeded.

20. The method of claim 19, wherein radiation detectors in the detection systems are mounted and configured for pivoting so as to face a suspected radiation source in response to a determination that the radiation detected by a detection system has exceeded the threshold.

21. A detection container comprising:
a cargo container having:
a length of about 20 feet or about 40 feet;
a width of about 8 feet; and
a height of about 8.5 or about 9.5 feet; and
a detection system including:
at least one radiation detector coupled with a power source, contained within the container and configured to detect radiation from outside the container, wherein the detector is a gamma-ray detector configured to detect $^{232}$U decay series gamma radiation; and
a transmitter contained within the cargo container, the transmitter being coupled with the radiation detector for transmitting data from the radiation detector.

22. The detection container of claim 21, wherein the gamma-ray detector is in the form of a detector array.

23. The detection container of claim 22, wherein the detector array comprises a plurality of detector elements that are oriented in different directions so as to enable imaging of gamma radiation sources from any direction.

24. The detection container of claim 22, the detection system further comprising a coded-aperture mask in front of the array.

25. The detection container of claim 21, wherein a neutron detector is also coupled with the power source.

* * * * *